(12) United States Patent
Tanabe et al.

(10) Patent No.: US 7,863,354 B2
(45) Date of Patent: Jan. 4, 2011

(54) SPECTACLE LENS

(75) Inventors: Seiichi Tanabe, Chiyoda-ku (JP);
Moritoshi Matsumoto, Chiyoda-ku (JP); Jiro Ariki, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

(21) Appl. No.: 12/448,048

(22) PCT Filed: Dec. 4, 2007

(86) PCT No.: PCT/JP2007/073741

§ 371 (c)(1),
(2), (4) Date: Jun. 5, 2009

(87) PCT Pub. No.: WO2008/069336

PCT Pub. Date: Jun. 12, 2008

(65) Prior Publication Data

US 2010/0029812 A1     Feb. 4, 2010

(30) Foreign Application Priority Data

Dec. 6, 2006    (JP) .............................. 2006-329354

(51) Int. Cl.
*C08K 5/3475*    (2006.01)
*C08K 5/36*    (2006.01)

(52) U.S. Cl. ........................................ 524/91; 524/305

(58) Field of Classification Search .................. 524/91, 524/305
See application file for complete search history.

(56) References Cited

U.S. PATENT DOCUMENTS

| | | | |
|---|---|---|---|
| 5,952,096 | A | 9/1999 | Yamashita et al. |
| 6,197,917 | B1 * | 3/2001 | Kimura et al. ............... 528/196 |
| 7,144,972 | B2 * | 12/2006 | Hayes ......................... 528/272 |
| 7,473,723 | B2 | 1/2009 | Ikari et al. |
| 2003/0055200 | A1 | 3/2003 | Ando et al. |
| 2007/0299168 | A1 | 12/2007 | Ariki et al. |

FOREIGN PATENT DOCUMENTS

| | | |
|---|---|---|
| CA | 2374444 | 12/2000 |
| EP | 0 837 086 A2 | 4/1998 |
| EP | 1 708 013 A1 | 10/2006 |
| JP | 0 786 675 A2 | 7/1997 |
| JP | 09-263694 | 10/1997 |
| JP | 2002-020607 | 1/2002 |
| JP | 2003-501508 | 1/2003 |
| JP | 2004-115568 | 4/2004 |
| JP | 2004-217734 | 8/2004 |
| JP | 2006-154783 | 6/2006 |
| WO | 2005/069061 | 7/2005 |

OTHER PUBLICATIONS

International Preliminary Report on Patentability issued Jun. 18, 2009 in the International (PCT) Application PCT/JP2007/073741 of which the present application is the U.S. National Stage.
International Search Report issued Mar. 18, 2008 in the International (PCT) Application of which the present application is the U.S. National Stage.
Supplementary European Search Report issued Nov. 17, 2009 in European application corresponding to present US application.

* cited by examiner

*Primary Examiner*—Kriellion A Sanders
(74) *Attorney, Agent, or Firm*—Wenderoth, Lind & Ponack, L.L.P.

(57) ABSTRACT

A resin composition which contains polycarbonate resin, does not transmit a wavelength of 385 nm substantially and has a high total light transmittance and excellent heat resistance.

The resin composition comprises (1) polycarbonate resin, (2) an ultraviolet absorber (A) such as 2-(2H-benzotriazol-2-yl)-p-cresol, (3) an ultraviolet absorber (B) such as 2,2'-methylenebis[4-(1,1,3,3-tetramethylbutyl)-6-(2H-benzotriazol-2-yl)phenol] and (4) at least one compound (C) represented by the following formula (I) or (II) and is used for spectacle lenses.

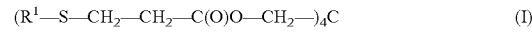

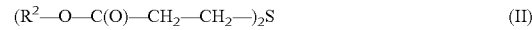

(wherein $R^1$ is an alkyl group having 4 to 20 carbon atoms, and $R^2$ is an alkyl group having 6 to 22 carbon atoms.)

8 Claims, No Drawings

SPECTACLE LENS

TECHNICAL FIELD

The present invention relates to a resin composition which is excellent in transparency, ultraviolet absorptivity and color, has such high resistance to molding heat that it has high reproducibility and rarely yellows even when it has heat history, and is suitable for spectacle lenses.

BACKGROUND OF THE ART

Polycarbonate resin has a high refractive index and excellent transparency and impact resistance and is now widely used as a material for lenses, especially spectacle lenses. Since spectacle lenses made of polycarbonate resin are thinner and lighter than existing glass lenses and plastic lenses manufactured by cast polymerization (to be referred to as "cast lenses" hereinafter) and have extremely high impact strength and therefore are safe and highly functional, they are used as vision corrective lenses and lenses for sunglasses and protective spectacles.

The protection of eyes from harmful ultraviolet radiation by providing ultraviolet absorptivity to spectacle lenses is strongly desired, and a coating layer having ultraviolet absorptivity is formed on the surfaces of cast lenses and glass lenses to meet this. However, the above coating method has disadvantages that these lenses become expensive and slightly yellow by themselves. An ultraviolet absorber is added before polymerization to manufacture the cast lenses. However, this method has such disadvantages as the inhibition of polymerizability and the marked yellowing of the lenses.

In contrast to this, in spectacle lenses made of polycarbonate resin, the polycarbonate resin itself has absorptivity for ultraviolet radiation on a short wavelength side and can be mixed with an ultraviolet absorber having absorptivity for ultraviolet radiation on a longer wavelength side than the ultraviolet absorption wavelength of the polycarbonate resin. However, the polycarbonate resin of the prior art can absorb ultraviolet radiation having a wavelength of up to 375 nm. To absorb ultraviolet radiation having a longer wavelength than that, a large amount of an ultraviolet absorber must be added. Since an ultraviolet absorber generally has sublimation properties, when a large amount of an ultraviolet absorber is added, it sublimes to contaminate the mirror surface of a metal mold at the time of injection molding the polycarbonate resin, thereby significantly impairing the appearance of the obtained lens.

Patent document 1 discloses a resin composition which comprises 100 parts by weight of a transparent thermoplastic resin and two different ultraviolet absorbers, one having an absorption maximum at a wavelength of 300 to 345 nm and the other having an absorption maximum at a wavelength of 346 to 400 nm. Although this resin composition was developed for spectacle lenses having excellent transparency and high ultraviolet absorptivity, as product waste is re-used in the resin composition, its color change is large when heat history such as re-extrusion is added and its resistance to molding heat is not satisfactory.

Patent document 2 discloses a resin composition which comprises polycarbonate resin, two different ultraviolet absorbers and a lactone-based heat stabilizer. However, it is said that the lactone-based heat stabilizer colors when it receives heat history, and it is reported that when it is added to polycarbonate resin, the color of the resin does not become stable.

Patent document 3 discloses a polycarbonate resin composition for rotational molding which contains a phosphorus-based stabilizer, a phenolic antioxidant and a sulfur-based antioxidant. Stated more specifically, it discloses a resin composition which comprises polycarbonate resin, a phosphorus-based heat stabilizer, a phenolic antioxidant, a sulfur-based antioxidant, a benzotriazole-based ultraviolet absorber and a release agent. However, the color and ultraviolet absorptivity of the resin composition are not satisfactory for spectacle lens application.
(Patent document 1) JP-A 09-263694
(Patent document 2) WO2005/069061
(Patent document 3) JP-A 2002-020607

DISCLOSURE OF THE INVENTION

It is a first object of the present invention to provide a resin composition which comprises polycarbonate resin, does not transmit a wavelength of 385 nm substantially and has a high total light transmittance.

It is a second object of the present invention to provide a resin composition which has such high heat resistance, especially reproducibility that it rarely changes in color by heat history.

It is a third object of the present invention to provide a resin composition which has such high heat resistance that it can be kept at a high temperature for a long time at the time of molding a spectacle lens.

It is a fourth object of the present invention to provide a resin composition which has such high heat resistance that its product waste can be re-used.

In the present invention, the "reproducibility" is for the evaluation of the degree of discoloration by adding heat history having a predetermined temperature to the resin composition repeatedly and a measure of the degree of deterioration by heat history.

In order to attain the above objects, the inventors of the present invention have conducted intensive studies on heat stabilizers and ultraviolet absorbers for use in polycarbonate resin and have found that when a specific heat stabilizer and two specific ultraviolet absorbers are used in combination in specific amounts, the color change of the obtained composition by heat at the time of molding is improved without impairing moldability and the transparency of a lens, and ultraviolet radiation having a wavelength of 385 can be almost completely absorbed. The present invention has been accomplished based on these findings.

That is, according to the present invention, there are provided the following:

1. A resin composition comprising (1) 100 parts by weight of polycarbonate resin, (2) 0.05 to 0.4 part by weight of at least one ultraviolet absorber (A) selected from the group consisting of 2-(2H-benzotriazol-2-yl)-p-cresol and 2-(2H-benzotriazol-2-yl)-4-(1,1,3,3-tetramethylbutyl) phenol, (3) 0.01 to 0.3 part by weight of at least one ultraviolet absorber (B) selected from the group consisting of 2-[5-chloro(2H)-benzotriazol-2-yl]-4-methyl-6-(tert-butyl)phenol, 2,2'-methylenebis[4-(1,1,3,3-tetramethylbutyl)-6-(2H-benzotriazol-2-yl)phenol] and 2-(2H-benzotriazol-2-yl)-4,6-bis(1-methyl-1-phenylethyl)phenol, and (4) 0.01 to 0.5 part by weight of at least one thioether-based compound (C) selected from the group consisting of a compound represented by the following formula (I) and a compound represented by the following formula (II).

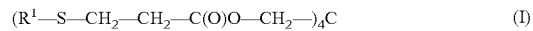

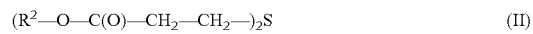

(wherein $R^1$ is an alkyl group having 4 to 20 carbon atoms, and $R^2$ is an alkyl group having 6 to 22 carbon atoms.)

2. The resin composition according to the above paragraph 1, wherein the ultraviolet absorber (A) is 2-(2H-benzotriazol-2-yl)-4-(1,1,3,3-tetramethylbutyl)phenol and the ultraviolet absorber (B) is at least one selected from the group consisting of 2-[5-chloro(2H)-benzotriazol-2-yl]-4-methyl-6-(tert-butyl)phenol and 2,2'-methylenebis[4-(1,1,3,3-tetramethylbutyl)-6-(2H-benzotriazol-2-yl)phenol].
3. The resin composition according to the above paragraph 1, wherein the mixing ratio (R) of the ultraviolet absorber (A) and the ultraviolet absorber (B) is 0.05 to 4 in terms of B/A weight ratio.
4. The resin composition according to the above paragraph 1, wherein the thioether-based compound (C) is pentaerythritol tetrakis(3-laurylthiopropionate).
5. The resin composition according to the above paragraph 1 which comprises a phosphorus-based heat stabilizer (D) in an amount of 0.001 to 0.2 part by weight based on 100 parts by weight of the polycarbonate resin.
6. The resin composition according to the above paragraph 1 which comprises a hindered phenol-based heat stabilizer (E) in an amount of 0.001 to 0.1 part by weight based on 100 parts by weight of the polycarbonate resin.
7. The resin composition according to the above paragraph 1, wherein the polycarbonate resin contains 2,2-bis(4-hydroxyphenyl)propane as the main diphenol component.
8. A molded article of the resin composition of the above paragraph 1.
9. A spectacle lens made of the resin composition of the above paragraph 1.

The present invention will be described in detail hereinunder.

BEST MODE FOR CARRYING OUT THE INVENTION (Polycarbonate Resin)

The polycarbonate resin used in the present invention is an aromatic polycarbonate resin obtained by reacting a diphenol with a carbonate precursor. Examples of the diphenol used herein include bis(hydroxyaryl)alkanes such as 2,2-bis(4-hydroxyphenyl)propane (generally called "bisphenol A"), bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxyphenyl)phenylmethane, 2,2-bis(4-hydroxy-3-methylphenyl)propane, 1,1-bis(4-hydroxy-3-tert-butylphenyl)propane, 2,2-bis(4-hydroxy-3-bromophenyl)propane, 2,2-bis(4-hydroxy-3,5-dibromophenyl)propane and 2,2-bis(4-hydroxy-3,5-dichlorophenyl)propane; bis(hydroxyphenyl)cycloalkanes such as 1,1-bis(hydroxyphenyl)cyclopentane and 1,1-bis(hydroxyphenyl)cyclohexane; dihydroxyaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone. These diphenols may be used alone or in combination of two or more.

Out of the above diphenols, a diphenol comprising 2,2-bis(4-hydroxyphenyl)propane (bisphenol A) as the main diphenol component is preferred, and a diphenol comprising bisphenol A in an amount of 70 mol % or more, particularly 80 mol % or more based on the total of all the diphenol components is particularly preferred. The most preferred is an aromatic polycarbonate resin whose diphenol component is substantially composed of bisphenol A.

The polycarbonate resin can be manufactured by methods and means known per se. A brief description is given of the basic means of manufacturing the polycarbonate resin. In the solution method using phosgene as the carbonate precursor, a diphenol component and phosgene are generally reacted with each other in the presence of an acid binder and an organic solvent. As the acid binder is used a hydroxide of an alkali metal such as sodium hydroxide or potassium hydroxide or an amine compound such as pyridine. As the organic solvent is used a halogenated hydrocarbon such as methylene chloride or chlorobenzene. A catalyst such as a tertiary amine or quaternary ammonium salt may be used to promote the reaction, and a terminal capping agent such as phenol or alkyl-substituted phenol exemplified by p-tert-butylphenol is preferably used as a molecular weight control agent. The reaction temperature is generally 0 to 40° C., the reaction time is several minutes to 5 hours, and pH during the reaction is preferably maintained at 10 or more.

The ester interchange method (melting method) in which a carbonic acid diester is used as the carbonate precursor is that a diphenol component and a carbonic acid diester in a predetermined ratio are stirred under heating in the presence of an inert gas and the formed alcohol or phenol is distilled off. The reaction temperature which differs according to the boiling point of the formed alcohol or phenol is generally 120 to 350° C. The reaction is carried out while the formed alcohol or phenol is distilled off in a reduced pressure from the beginning. A general ester interchange reaction catalyst may be used to promote the reaction.

Examples of the carbonic acid diester used in this ester interchange reaction include diphenyl carbonate, dinaphthyl carbonate, dimethyl carbonate, diethyl carbonate and dibutyl carbonate, out of which diphenyl carbonate is particularly preferred.

The molecular weight of the polycarbonate resin used in the present invention is preferably $1.7 \times 10^4$ to $3.0 \times 10^4$, particularly preferably $2.0 \times 10^4$ to $2.6 \times 10^4$ in terms of viscosity average molecular weight. A spectacle lens is obtained by precision molding, it is important that the mirror surface of a metal mold should be accurately transferred to provide predetermined curvature and diopter, and a resin having high melt fluidity and low viscosity is desired. However, when the viscosity of the resin is too low, impact strength which is one of the features of the polycarbonate resin cannot be maintained. The viscosity average molecular weight (M) of the polycarbonate resin is obtained by inserting a specific viscosity ($\eta_{sp}$) obtained from a solution prepared by dissolving 0.7 g of the polycarbonate resin in 100 ml of methylene chloride at 20° C. with an Ostwald viscometer into the following equation.

$\eta_{sp}/c = [\eta] + 0.45 \times [\eta]^2 c$ ([η] is an intrinsic viscosity)

$[\eta] = 1.23 \times 10^{-4} M^{0.83}$ $c = 0.7$ (Ultraviolet Absorber (A))

The resin composition of the present invention comprises two different ultraviolet absorbers (A) and (B) in the polycarbonate resin which differ from each other in wavelength absorption property.

One of the ultraviolet absorbers is an ultraviolet absorber (A) and at least one selected from the group consisting of 2-(2H-benzotriazol-2-yl)-p-cresol (UV-0) and 2-(2H-benzotriazol-2-yl)-4-(1,1,3,3-tetramethylbutyl)phenol (UV-1).

This ultraviolet absorber (A) has an absorption maximum at a wavelength of around 340 nm.

2-(2H-benzotriazol-2-yl)-4-(1,1,3,3-tetramethyl butyl)phenol (UV-1) is preferred as the ultraviolet absorber (A).

The content of the ultraviolet absorber (A) is 0.05 to 0.4 part by weight, preferably 0.1 to 0.35 part by weight, more preferably 0.15 to 0.33 part by weight based on 100 parts by weight of the polycarbonate resin. When the content is lower than 0.05 part by weight, ultraviolet absorptivity becomes unsatisfactory and when the content is higher than 0.4 part by weight, ultraviolet absorptivity does not improve any longer, and sublimation at the time of molding, an increase in haze and the deterioration of color become marked.

(Ultraviolet Absorber (B))

The other ultraviolet absorber is an ultraviolet absorber (B) and at least one selected from the group consisting of 2-[5-chloro(2H)-benzotriazol-2-yl]-4-methyl-6-(tert-butyl)phenol (UV-3), 2,2'-methylenebis[4-(1,1,3,3-tetramethylbutyl)-6-(2H-benzotriazol-2-yl)phenol] (UV-2) and 2-(2H-benzotriazol-2-yl)-4,6-bis(1-methyl-1-phenylethyl)phenol (UV-4). This ultraviolet absorber (B) has an absorption maximum at a wavelength of 343 to 360 nm. The absorption maximums of these two ultraviolet absorbers (A) and (B) are absorption spectra measured by using a chloroform solution having a concentration of 10 mg/liter and a 10 mm-thick quartz cell.

The ultraviolet absorber (B) is preferably at least one selected from the group consisting of 2-[5-chloro(2H)-benzotriazol-2-yl]-4-methyl-6-(tert-butyl)phenol (UV-3) and 2,2'-methylenebis[4-(1,1,3,3-tetramethylbutyl)-6-(2H-benzotriazol-2-yl)phenol] (UV-2).

The content of the ultraviolet absorber (B) is 0.01 to 0.3 part by weight, preferably 0.01 to 0.27 part by weight, more preferably 0.02 to 0.25 part by weight based on 100 parts by weight of the polycarbonate resin. When the content is lower than 0.01 part by weight, ultraviolet absorptivity becomes unsatisfactory and when the content is higher than 0.3 part by weight, the ultraviolet absorber (B) greatly deteriorates the color of the polycarbonate resin, whereby a spectacle lens having a dim color is obtained.

When one of the two ultraviolet absorbers (A) and (B) is used, the absorption of ultraviolet radiation having a wavelength of 385 nm becomes unsatisfactory or when a large amount of the ultraviolet absorber is added to such an extent that absorption becomes satisfactory, the ultraviolet absorber sublimes at the time of molding, thereby increasing the haze of the obtained lens or deteriorating the color of the lens. By using a combination of the ultraviolet absorbers (A) and (B), a 2 mm-thick molded plate can absorb ultraviolet radiation having a wavelength of 385 nm almost completely at a spectral transmittance of 1% or less, maintains a total light transmittance of about 90% and has a good lens color though the amounts of these ultraviolet absorbers are relatively small.

The mixing ratio (R) of the ultraviolet absorbers (A) and (B) is preferably 0.05 to 4, more preferably 0.05 to 3, much more preferably 0.05 to 1, particularly preferably 0.05 to 0.5 in terms of B/A weight ratio. When the mixing ratio (R) is less than 0.05, ultraviolet absorptivity is unsatisfactory and when the mixing ratio (R) is more than 4, the deterioration of color tends to become marked.

(Thioether-based Compound (C))

The resin composition of the present invention comprises at least one thioether-based compound (C) selected from the group consisting of a compound represented by the following formula (I) and a compound represented by the following formula (II). Although this thioether-based compound (C) is known as a heat stabilizer for polycarbonate resin, when the two different ultraviolet absorbers (A) and (B) are used in combination with a small amount of the thioether-based compound, the reproducibility and resistance to molding heat of the resin composition of the present invention significantly improve.

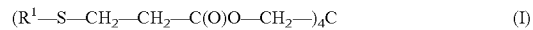

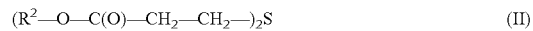

(wherein $R^1$ is an alkyl group having 4 to 20 carbon atoms, and $R^2$ is an alkyl group having 6 to 22 carbon atoms.)

In the compound represented by the formula (I), $R^1$ is preferably an alkyl group having 10 to 18 carbon atoms. Examples of the alkyl group include decane group, dodecane group, tetradecane group, hexadecane group and octadecane group.

Specific examples of the compound represented by the formula (I) include pentaerythritol tetrakis(3-laurylthiopropionate), pentaerythritol tetrakis(3-myristylthiopropionate) and pentaerythritol tetrakis(3-stearylthiopropionate). Out of these, pentaerythritol tetrakis(3-laurylthiopropionate) and pentaerythritol tetrakis(3-myristylthiopropionate) are preferred, and pentaerythritol tetrakis(3-laurylthiopropionate) is particularly preferred.

In the compound represented by the formula (II), $R^2$ is preferably an alkyl group having 10 to 18 carbon atoms. Examples of the alkyl group include decane group, dodecane group, tetradecane group, hexadecane group and octadecane group.

Specific examples of the compound represented by the formula (II) include dilauryl-3,3'-thiodipropionate, dimyristyl-3,3'-thiodipropionate and distearyl-3,3'-thiodipropionate. Out of these, dilauryl-3,3'-thiodipropionate and dimyristyl-3,3'-thiodipropionate are preferred, and dimyristyl-3,3'-thiodipropionate is particularly preferred.

The content of the thioether-based compound (C) is 0.01 to 0.5 part by weight, preferably 0.01 to 0.3 part by weight, more preferably 0.02 to 0.1 part by weight based on 100 parts by weight of the polycarbonate resin. When the content is lower than 0.01 part by weight, its effect is small and satisfactory reproducibility and resistance to molding heat cannot be obtained and when the content is higher than 0.5 part by weight, the resistance to molding heat of the resin lowers disadvantageously.

(Phosphorus-Based Heat Stabilizer (D))

The resin composition of the present invention may comprise a phosphorus-based heat stabilizer (D). The content of the phosphorus-based heat stabilizer (D) is preferably 0.001 to 0.2 part by weight, more preferably 0.01 to 0.1 part by weight based on 100 parts by weight of the polycarbonate resin.

The phosphorus-based heat stabilizer (D) is phosphorous acid, phosphoric acid, phosphonous acid, phosphonic acid or ester thereof. Specific examples of the phosphorus-based heat stabilizer include triphenyl phosphite, tris(nonylphenyl) phosphite, tris(2,4-di-tert-butylphenyl)phosphite, tris(2,6-di-tert-butylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, distearyl pentaerythritol diphosphite, tributyl phosphate, triethyl phosphate, trimethyl phosphate, triphenyl phosphate, diphenylmonoorthoxenyl phosphate, dibutyl phosphate, dioctyl phosphate, diisopropyl phosphate, dimethyl benzenephosphonate, diethyl benzenephosphonate, dipropyl benzenephosphonate, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, bis(2,4-di-tert-butylphenyl)-4-phenyl-phenyl phosphonite and bis(2,4-di-tert-butylphenyl)-3-phenyl-phenyl phosphonite.

Out of these, tris(2,4-di-tert-butylphenyl)phosphite, tris(2,6-di-tert-butylphenyl)phosphite, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, bis(2,4-di-tert-butylphenyl)-4-phenyl-phenyl phosphonite and bis(2,4-di-tert-butylphenyl)-3-phenyl-phenyl phosphonite are preferably used, and tetrakis(2,4-di-tert-butylphenyl)-4,4'-biphenylene diphosphonite is particularly preferably used.

(Hindered Phenol-based Heat Stabilizer (E))

The resin composition of the present invention may comprise a hindered phenol-based heat stabilizer (E). The content of the hindered phenol-based heat stabilizer (E) is preferably 0.001 to 0.1 part by weight, more preferably 0.01 to 0.1 part by weight based on 100 parts by weight of the polycarbonate resin.

Examples of the hindered phenol-based heat stabilizer (E) include triethylene glycol-bis[3-(3-tert-butyl-5-methyl-4-hydroxyphenyl) propionate], 1,6-hexanediol-bis[3-(3,5-di-tert-butyl-4-hydroxyphenyl) propionate], pentaerythritol tetrakis[3-(3,5-di-tert-butyl-4-hydroxyphenyl) propionate], octadecyl-3-(3,5-di-tert-butyl-4-hydroxyphenyl) propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide), 3,5-di-tert-butyl-4-hydroxy-benzylphosphonate-diethyl ester, tris(3,5-di-tert-butyl-4-hydroxybenzyl)isocyanurate and 3,9-bis{1,1-dimethyl-2-[β-(3-tert-butyl-4-hydroxy-5-methylphenyl)propionyloxy]ethyl}-2,4,8,10-tetraoxaspiro(5,5)undecane. Out of these, octadecyl-3-(3,5-di-tert-butyl-4-hydroxyphenyl) propionate is particularly preferred.

(Release Agent)

The resin composition of the present invention may comprise a release agent to improve the releasability from a metal mold of a resin molded spectacle lens at the time of melt molding. The content of the release agent is preferably 0.01 to 0.6 part by weight, more preferably 0.03 to 0.5 part by weight based on 100 parts by weight of the polycarbonate resin. The release agent is preferably at least one selected from the group consisting of an ester of a monohydric alcohol having 1 to 20 carbon atoms and a saturated aliphatic acid having 10 to 30 carbon atoms and a partial ester or whole ester of a polyhydric alcohol having 1 to 25 carbon atoms and a saturated aliphatic acid having 10 to 30 carbon atoms.

Examples of the ester of a monohydric alcohol and a saturated aliphatic acid include stearyl stearate, palmityl palmitate, butyl stearate, methyl laurate and isopropyl palmitate, out of which stearyl stearate is preferred.

Examples of the partial ester or whole ester of a polyhydric alcohol and a saturated aliphatic acid include partial esters or whole esters such as monoglyceride stearate, diglyceride stearate, triglyceride stearate, monosorbitate stearate, monoglyceride behenate, pentaerythritol monostearate, pentaerythritol tetrastearate, pentaerythritol tetrapelargonate, propylene glycol monostearate, biphenyl biphenate, sorbitan monostearate, 2-ethylhexyl stearate and dipentaerythritols including dipentaerythritol hexastearate.

Out of these esters, a mixture of monoglyceride stearate, triglyceride stearate, pentaerythritol tetrastearate or triglyceride stearate and stearyl stearate is preferably used.

(Bluing Agent)

The resin composition of the present invention may comprise a bluing agent to erase the yellow tinge of a lens due to the polycarbonate resin or ultraviolet absorbers when it is molded into a spectacle lens. Any bluing agent may be used without any problem if it is used for polycarbonate resin. In general, an anthraquinone-based dye is preferred because it is easily acquired.

Examples of the bluing agent are given below. Trade names: Macrolex Violet B, Macrolex Blue RR and Macrolex Violet 3R of Bayer A.G., Dia Resin Blue G, Dia Resin Violet D, Dia Resin Blue J and Dia Resin BlueN of Mitsubishi Chemical Corporation, Sumiplast Violet B of Sumitomo Chemical Co., Ltd., and Polysynthrene Blue RLS of Sandoz Inc.

The bluing agent is generally contained in the polycarbonate resin composition in an amount of 0.3 to 1.2 ppm. When the bluing agent is contained too much, the absorption of the bluing agent becomes strong and luminous transmittance lowers, whereby a dim spectacle lens is obtained. Particularly in the case of a visual correction spectacle lens, as it has a thick portion and a thin portion and there is a big change in the thickness of the lens, when the absorption of the bluing agent is strong, a color difference is produced by the difference in thickness between the center portion and the peripheral portion of the lens, whereby a lens having a very poor appearance is obtained.

(Manufacture of Resin Composition)

The resin composition of the present invention can be manufactured by mixing together the ultraviolet absorber (A), the ultraviolet absorber (B) and the thioether-based compound (C) and optionally other components.

The time and the method for mixing the ultraviolet absorber (A), the ultraviolet absorber (B) and the thioether-based compound (C) are not particularly limited. The time for mixing these may be during or after the polymerization of the polycarbonate resin. They may be added to a powdery, pellet-like or bead-like polycarbonate resin. The ultraviolet absorber (A) and the ultraviolet absorber (B) may be added simultaneously or in an arbitrary order.

These components are preferably mixed together by means of any mixer such as tumbler, ribbon blender or high-speed mixer to be melt kneaded together.

(Molded Article, Spectacle Lens)

The present invention includes a molded article such as a spectacle lens formed from the above resin composition.

The spectacle lens formed from the resin composition of the present invention has extremely high transparency and a total light transmittance of about 90% when it is as thick as 2 mm.

Since the spectacle lens of the present invention contains polycarbonate resin as a base material, it has high impact strength and a high refractive index and is excellent in the effect of absorbing ultraviolet radiation, especially harmful ultraviolet radiation having a wavelength of 385 nm or less.

The resin composition of the present invention can be molded into a spectacle lens in accordance with a melt molding method known per se. The resin composition may be molten, injected into a metal mold and compression molded to a desired shape in the metal mold. This molding method is called "extrusion pressure molding". By employing this compression molding, the residual distortion of a molded article is reduced, a molded article without a weld line can be obtained, and a high-quality spectacle lens can be obtained.

EXAMPLES

The following examples are provided to further illustrate the present invention. "Parts" means parts by weight and evaluations were carried out by the following methods.

(1) Spectral Transmittance

A virgin pellet obtained in each Example was molded by an injection molding machine (cylinder temperature of 350° C., 1 minute cycle) to obtain a "measuring flat plate" (90 mm in length×50 mm in width×2 mm in thickness). The spectral transmittance at a wavelength range of 300 to 500 nm of the "measuring flat plate" was measured by the Cary5000 of Varian Inc. to obtain a spectral transmittance at 385 nm.

(2) Total Light Transmittance

A virgin pellet obtained in each Example was molded by an injection molding machine (cylinder temperature of 350° C., 1 minute cycle) to obtain a "measuring flat plate" (90 mm in length×50 mm in width×2 mm in thickness). The total light transmittance (Tt) of the "measuring flat plate" was measured by the NDH-2000 of Nippon Denshoku Industries Co., Ltd. in accordance with ISO13468.

(3) resistance to Molding Heat (Reproducibility)

The yellowness (b*) and whiteness (L*) of a virgin pellet obtained in each Example and the yellowness (b'*) and whiteness (L'*) of a re-pellet were measured by a C light source reflection method using the SE-2000 of Nippon Denshoku Industries Co., Ltd., and the degrees of discoloration of the virgin pellet and re-pellet are represented by $\Delta b^* (=b'^*-b^*)$ and $\Delta L^* (=L'^*-L^*)$, respectively. As $\Delta b^*$ and $\Delta L^*$ become smaller, a change in color is smaller and better.

(4) Resistance to Molding Heat (Resistance to Residence Heat)

A virgin pellet obtained in each Example was molded by an injection molding machine (cylinder temperature of 350° C., 1 minute cycle) to obtain a "measuring flat plate before residence" (90 mm in length×50 mm in width×2 mm in thickness). After the resin was retained in the cylinder of the injection molding machine for 10 minutes, it was molded to obtain a "measuring flat plate after residence" (90 mm in length×50 mm in width×2 mm in thickness). The color (L, a, b) of the flat plate before and after residence was measured by the C light source reflection method using the SE-2000 of Nippon Denshoku Industries Co., Ltd. to obtain a color difference $\Delta E$ from the following equation. As $\Delta E$ becomes smaller, resistance to molding heat becomes higher.

$$\Delta E = \{(L-L')^2 + (a-a')^2 + (b-b')^2\}^{1/2}$$

color of measuring flat plate before residence: L, a, b color of measuring flat plate after residence: L', a', b'

Example 1

(Virgin Pellet)

0.3 part of 2-(2H-benzotriazol-2-yl)-4-(1,1,3,3-tetramethylbutyl)phenol (UV-1, absorption maximum at 340 nm) as the ultraviolet absorber (A), 0.04 part of 2,2'-methylenebis[4-(1,1,3,3-tetramethylbutyl)-6-(2H-benzotriazol-2-yl)phenol] (UV-2, absorption maximum at 349 nm) as the ultraviolet absorber (B), 0.02 part of pentaerythritol tetrakis(3-laurylthiopropionate) (HS-1) as the thioether-based compound (C), 0.25 part of a mixture of triglyceride stearate and stearyl stearate (Rikemal SL900 (trade name) of Riken Vitamin Co., Ltd.) as a release agent, 0.03 part of the following phosphorus-based heat stabilizer (HS-2) and 0.3 ppm of a compound represented by the following formula as a bluing agent were added to 100 parts of a polycarbonate resin powder having a viscosity average molecular weight of 22,400 obtained by the interfacial polymerization of bisphenol A and phosgene in accordance with a commonly used method and fully mixed with the polycarbonate resin powder by a tumbler, and the resulting mixture was pelletized by a 30 mm-diameter vented extrusion molding machine at 280° C. (virgin pellet).

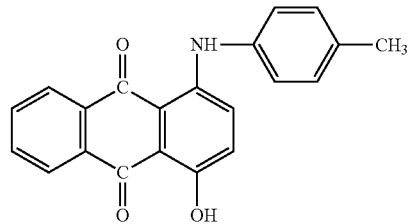

(Re-pellet)

To investigate the color of a re-pellet, pelletization was carried out twice continuously under the same extrusion conditions as above to obtain a re-pellet. The virgin pellet and the re-pellet were evaluated by the above method. The evaluation results are shown in Table 1.

(Spectacle Lens)

A lens for negative spectacles (radius of curvature of front surface of 293 mm, radius of curvature of rear surface of –73 mm, center thickness of 1.5 mm, edge thickness of 10.0 mm, lens outer diameter of 77.5 mm) was manufactured by injection compression molding using a metal mold for concave spectacle lenses and the obtained virgin pellet at a cylinder temperature of 300° C. and a mold temperature of 125° C. This lens had excellent transparency and a good appearance. This lens was coated uniformly with a UV curable coating comprising trimethylolpropane tri(meth)acrylate as the main component by dipping. It was dried at room temperature and cured by an UV exposure device at a conveyor speed of 4 m/min and a dose of 650 mJ/cm$^2$. The appearance of the obtained molded product was good and the deformation of the lens substrate was not seen before and after UV curing. Phosphorus-based heat stabilizer (HS-2): a mixture of the following components d-1-1, d-1-2 and d-1-3 in a weight ratio of 71:15:14

Component d-1-1: a mixture of tetrakis(2,4-di-tert-butylphenyl)-4,4'-biphenylene diphosphonite, tetrakis(2,4-di-tert-butylphenyl)-4,3'-biphenylene diphosphonite and tetrakis (2,4-di-t-butylphenyl)-3,3'-biphenylene diphosphonite in a weight ratio of 10:50:10

Component d-1-2: a mixture of bis(2,4-di-tert-butylphenyl)-4-phenyl-phenyl phosphonite and bis(2,4-di-tert-butylphenyl)-3-phenyl-phenyl phosphonite in a weight ratio of 5:3

Component d-1-3: tris(2,4-di-tert-butylphenyl)phosphite

Examples 2 to 8 and Comparative Examples 1 to 7

The procedure of Example 1 was repeated except that the ultraviolet absorbers and heat stabilizers shown in Table 1 were used in amounts shown in Table 1. The evaluation results are shown in Table 1.

Example 9

(Virgin Pellet)
0.33 part of 2-(2H-benzotriazol-2-yl)-4-(1,1,3,3-tetramethylbutyl)phenol (UV-1) as the ultraviolet absorber (A), 0.02 part of 2-[5-chloro(2H)-benzotriazol-2-yl]-4-methyl-6-(tert-butyl)phenol (UV-3) as the ultraviolet absorber (B), 0.02 part of pentaerythritol tetrakis(3-laurylthiopropionate) (HS-1) as the thioether-based compound (C), 0.25 part of a mixture of triglyceride stearate and stearyl stearate (Rikemal SL900 (trade name) of Riken Vitamin Co., Ltd.) as a release agent, 0.03 part of the same phosphorus-based heat stabilizer (HS-2) as used in Example 1 and 0.8 ppm of the same bluing agent as used in Example 1 were added to 100 parts of a polycarbonate resin powder having a viscosity average molecular weight of 23,900 obtained by the interfacial polymerization of bisphenol A and phosgene in accordance with a commonly used method and fully mixed with the polycarbonate resin powder by a tumbler, and the resulting mixture was pelletized by a 30 mm-diameter vented extrusion molding machine at 280° C. (virgin pellet).

(Re-pellet)
To investigate the color of a re-pellet, pelletization was carried out twice continuously under the same extrusion conditions as above to obtain a re-pellet. The virgin pellet and the re-pellet were evaluated by the above method. The evaluation results are shown in Table 1.

(Spectacle Lens)
A lens for negative spectacles (radius of curvature of front surface of 293 mm, radius of curvature of rear surface of −73 mm, center thickness of 1.5 mm, edge thickness of 10.0 mm, lens outer diameter of 77.5 mm) was manufactured by injection compression molding using a metal mold for concave spectacle lenses and the obtained virgin pellet at a cylinder temperature of 300° C. and a mold temperature of 125° C. This lens had excellent transparency and a good appearance. This lens was coated uniformly with an UV curable coating comprising trimethylolpropane tri(meth)acrylate as the main component by dipping. It was dried at room temperature and cured by a UV exposure device at a conveyor speed of 4 m/min and a dose of 650 mJ/cm². The appearance of the obtained molded product was good and the deformation of the lens substrate was not seen before and after UV curing.

Examples 10 to 14 and Comparative Examples 8 to 14

The procedure of Example 9 was repeated except that the ultraviolet absorbers and heat stabilizers shown in Table 1 were used in amounts shown in Table 1. The evaluation results are shown in Table 1.
Symbols in Table 1 represent the following compounds.
PC-1: polycarbonate resin powder having a viscosity average molecular weight of 22,400 obtained by the interfacial polymerization of bisphenol A and phosgene
PC-2: polycarbonate resin powder having a viscosity average molecular weight of 23,900 obtained by the interfacial polymerization of bisphenol A and phosgene
UV-1: 2-(2H-benzotriazol-2-yl)-4-(1,1,3,3-tetramethylbutyl)phenol
UV-2: 2,2'-methylenebis[4-(1,1,3,3-tetramethylbutyl)-6-(2H-benzotriazol-2-yl)phenol]
UV-3: 2-[5-chloro(2H)-benzotriazol-2-yl]-4-methyl-6-(tert-butyl)phenol
UV-4: 2-(2H-benzotriazol-2-yl)-4,6-bis(1-methyl-1-phenylethyl)phenol
HS-1: pentaerythritol tetrakis(3-laurylthiopropionate)
HS-2: a mixture of the following components d-1-1, d-1-2 and d-1-3 in a weight ratio of 71:15:14
Component d-1-1: a mixture of tetrakis(2,4-di-tert-butylphenyl)-4,4'-biphenylene diphosphonite, tetrakis(2,4-di-tert-butylphenyl)-4,3'-biphenylene diphosphonite and tetrakis(2,4-di-tert-butylphenyl)-3,3'-biphenylene diphosphonite in a weight ratio of 100:50:10
Component d-1-2: a mixture of bis(2,4-di-tert-butylphenyl)-4-phenyl-phenyl phosphonite and bis(2,4-di-tert-butylphenyl)-3-phenyl-phenyl phosphonite in a weight ratio of 5:3
Component d-1-3: tris(2,4-di-tert-butylphenyl)phosphite
HS-3: tris(2,4-di-tert-butylphenyl)phosphite
HS-4: octadecyl-3-(3,5-di-tert-4-hydroxyphenyl)propionate
HS-5: dimyristyl-3,3'-thiodipropionate
HS-6: 5,7-di-tert-butyl-3-(3,4-dimethyl-phenyl)-3H-benzofuran-2-one

TABLE 1

| | | Ultraviolet absorber | | Stabilizer | | Resistance to molding heat | | | | | | Resistance to residence heat | Total light transmittance Tt | Spectral transmittance 385 nm |
|---|---|---|---|---|---|---|---|---|---|---|---|---|---|---|
| | | | | | | Reproducibility | | | | | | | | |
| | PC | Type | Amount (part) | Type | Amount (part) | b* | b'* | Δb | L* | L'* | ΔL | ΔE | (%) | (%) |
| Ex. 1 | PC-1 | UV-1 | 0.30 | HS-1 | 0.02 | −1.5 | −0.9 | 0.6 | 66.6 | 63.4 | −3.2 | 0.2 | 90 | 0.5 |
| | | UV-2 | 0.04 | HS-2 | 0.03 | | | | | | | | | |
| Ex. 2 | PC-1 | UV-1 | 0.30 | HS-1 | 0.05 | −1.5 | −1.0 | 0.5 | 65.8 | 63.4 | −2.3 | 0.3 | 90 | 0.5 |
| | | UV-2 | 0.04 | HS-2 | 0.03 | | | | | | | | | |
| Ex. 3 | PC-1 | UV-1 | 0.30 | HS-1 | 0.10 | −1.6 | −1.1 | 0.5 | 66.1 | 63.3 | −2.8 | 0.2 | 90 | 0.5 |
| | | UV-2 | 0.04 | HS-2 | 0.03 | | | | | | | | | |
| Ex. 4 | PC-1 | UV-1 | 0.30 | HS-1 | 0.05 | −1.6 | −1.2 | 0.4 | 67.0 | 63.9 | −3.1 | 0.2 | 90 | 0.5 |
| | | UV-2 | 0.04 | HS-3 | 0.03 | | | | | | | | | |

TABLE 1-continued

| | | Ultraviolet absorber | | Stabilizer | | Resistance to molding heat | | | | | | Resistance to residence heat ΔE | Total light transmittance Tt (%) | Spectral transmittance 385 nm (%) |
|---|---|---|---|---|---|---|---|---|---|---|---|---|---|---|
| | | | | | | Reproducibility | | | | | | | | |
| | PC | Type | Amount (part) | Type | Amount (part) | b* | b'* | Δb | L* | L'* | ΔL | | | |
| Ex. 5 | PC-1 | UV-1 | 0.30 | HS-1 | 0.05 | −1.6 | −1.0 | 0.6 | 65.5 | 63.3 | −2.2 | 0.2 | 90 | 0.5 |
| | | UV-2 | 0.04 | HS-4 | 0.05 | | | | | | | | | |
| Ex. 6 | PC-1 | UV-1 | 0.30 | HS-1 | 0.05 | −1.5 | −1.1 | 0.4 | 65.9 | 63.9 | −2.0 | 0.2 | 90 | 0.5 |
| | | UV-2 | 0.04 | HS-2 | 0.03 | | | | | | | | | |
| | | — | — | HS-4 | 0.05 | | | | | | | | | |
| Ex. 7 | PC-1 | UV-1 | 0.30 | HS-1 | 0.05 | −1.6 | −1.3 | 0.3 | 66.1 | 63.4 | −2.7 | 0.2 | 90 | 0.5 |
| | | UV-2 | 0.04 | — | — | | | | | | | | | |
| Ex. 8 | PC-1 | UV-1 | 0.30 | HS-1 | 0.05 | −1.4 | −1.0 | 0.4 | 66.4 | 63.7 | −2.8 | 0.2 | 90 | 0.5 |
| | | UV-4 | 0.06 | — | — | | | | | | | | | |
| C. Ex. 1 | PC-1 | UV-1 | 0.30 | HS-2 | 0.03 | −1.3 | 0.2 | 1.5 | 65.7 | 63.3 | −2.4 | 0.2 | 90 | 0.5 |
| | | UV-2 | 0.04 | — | — | | | | | | | | | |
| C. Ex. 2 | PC-1 | UV-1 | 0.30 | HS-3 | 0.03 | −1.4 | 0.2 | 1.6 | 66.2 | 62.5 | −3.7 | 0.3 | 90 | 0.5 |
| | | UV-2 | 0.04 | — | — | | | | | | | | | |
| C. Ex. 3 | PC-1 | UV-1 | 0.34 | HS-1 | 0.05 | −1.4 | −0.9 | 0.5 | 66.4 | 62.5 | −3.9 | 0.3 | 90 | 1.3 |
| | | — | — | — | — | | | | | | | | | |
| C. Ex. 4 | PC-1 | UV-1 | 0.30 | HS-1 | 0.005 | −1.5 | −0.2 | 1.3 | 66.4 | 63.2 | −3.3 | 0.2 | 90 | 0.5 |
| | | UV-2 | 0.04 | HS-2 | 0.03 | | | | | | | | | |
| C. Ex. 5 | PC-1 | UV-1 | 0.30 | HS-1 | 0.005 | −1.4 | −0.1 | 1.3 | 66.2 | 62.8 | −3.4 | 0.3 | 90 | 0.5 |
| | | UV-2 | 0.04 | HS-3 | 0.03 | | | | | | | | | |
| C. Ex. 6 | PC-1 | UV-1 | 0.30 | HS-6 | 0.02 | −1.5 | −1.3 | 0.2 | 66.2 | 60.1 | −6.1 | 0.4 | 90 | 0.5 |
| | | UV-2 | 0.04 | HS-2 | 0.03 | | | | | | | | | |
| C. Ex. 7 | PC-1 | UV-1 | 0.30 | HS-6 | 0.05 | −1.6 | −1.7 | −0.1 | 65.9 | 59.5 | −6.4 | 0.4 | 90 | 0.5 |
| | | UV-2 | 0.04 | HS-2 | 0.03 | | | | | | | | | |
| Ex. 9 | PC-2 | UV-1 | 0.33 | HS-1 | 0.02 | −2.0 | −1.4 | 0.6 | 63.2 | 61.3 | −1.8 | 0.2 | 90 | 0.2 |
| | | UV-3 | 0.02 | HS-2 | 0.03 | | | | | | | | | |
| Ex. 10 | PC-2 | UV-1 | 0.33 | HS-1 | 0.05 | −2.1 | −1.7 | 0.4 | 64.7 | 61.7 | −3.0 | 0.3 | 90 | 0.2 |
| | | UV-3 | 0.02 | HS-2 | 0.03 | | | | | | | | | |
| Ex. 11 | PC-2 | UV-1 | 0.33 | HS-1 | 0.10 | −2.0 | −1.6 | 0.4 | 64.6 | 61.9 | −2.7 | 0.3 | 90 | 0.2 |
| | | UV-3 | 0.02 | HS-3 | 0.03 | | | | | | | | | |
| Ex. 12 | PC-2 | UV-1 | 0.33 | HS-1 | 0.05 | −2.3 | −1.8 | 0.5 | 64.2 | 60.8 | −3.4 | 0.3 | 90 | 0.2 |
| | | UV-3 | 0.02 | — | — | | | | | | | | | |
| Ex. 13 | PC-2 | UV-1 | 0.15 | HS-1 | 0.05 | −3.4 | −2.8 | 0.6 | 64.3 | 60.0 | −4.3 | 0.3 | 90 | <0.1 |
| | | UV-2 | 0.15 | HS-2 | 0.03 | | | | | | | | | |
| Ex. 14 | PC-2 | UV-1 | 0.33 | HS-5 | 0.05 | −2.0 | −1.4 | 0.6 | 64.0 | 61.3 | −2.7 | 0.3 | 90 | 0.2 |
| | | UV-3 | 0.02 | HS-2 | 0.03 | | | | | | | | | |
| C. Ex. 8 | PC-2 | UV-1 | 0.33 | HS-2 | 0.03 | −2.4 | −0.3 | 2.1 | 65.2 | 59.5 | −5.7 | 0.3 | 90 | 0.2 |
| | | UV-3 | 0.02 | — | — | | | | | | | | | |
| C. Ex. 9 | PC-2 | UV-1 | 0.33 | HS-3 | 0.03 | −1.7 | 0.1 | 1.8 | 64.6 | 61.9 | −2.7 | 0.3 | 90 | 0.2 |
| | | UV-3 | 0.02 | — | — | | | | | | | | | |
| C. Ex. 10 | PC-2 | UV-3 | 0.35 | HS-1 | 0.05 | 1.4 | 1.9 | 0.5 | 63.8 | 59.7 | −4.1 | 1.0 | 90 | <0.1 |
| | | — | — | — | — | | | | | | | | | |
| C. Ex. 11 | PC-2 | UV-1 | 0.33 | HS-1 | 0.005 | −2.3 | −1.0 | 1.3 | 62.4 | 59.8 | −2.6 | 0.2 | 90 | 0.2 |
| | | UV-3 | 0.02 | HS-2 | 0.03 | | | | | | | | | |
| C. Ex. 12 | PC-2 | UV-1 | 0.33 | HS-1 | 0.005 | −2.1 | −0.7 | 1.4 | 62.7 | 59.5 | −3.2 | 0.3 | 90 | 0.2 |
| | | UV-3 | 0.02 | HS-3 | 0.03 | | | | | | | | | |
| C. Ex. 13 | PC-2 | UV-1 | 0.33 | HS-6 | 0.02 | −2.0 | −1.8 | 0.2 | 64.0 | 57.0 | −7.0 | 0.4 | 90 | 0.2 |
| | | UV-3 | 0.02 | HS-2 | 0.03 | | | | | | | | | |
| C. Ex. 14 | PC-2 | UV-1 | 0.33 | HS-6 | 0.05 | −2.2 | −2.4 | −0.2 | 63.5 | 55.7 | −7.8 | 0.5 | 90 | 0.2 |
| | | UV-3 | 0.02 | HS-2 | 0.03 | | | | | | | | | |

Ex.: Example
C. Ex.: Comparative Example

As obvious from Table 1, it is understood that the resin composition of the present invention rarely changes in color by heat history at 280° C. and has excellent reproducibility. Therefore, it is known that the resin composition of the present invention is useful as a material to be formed into a spectacle lens by injection compression molding at 280 to 300° C. It is further understood that the resin composition has excellent resistance to residence heat at 350° C.

EFFECT OF THE INVENTION

The resin composition of the present invention does not transmit a wavelength of 385 nm substantially and has a high total light transmittance. The resin composition of the present invention has such high heat resistance that it rarely changes in color by heat history. The resin composition of the present invention has such high heat resistance that it can be kept at a high temperature for a long time at the time of molding a spectacle lens. The resin composition of the present invention has such high heat resistance that its product waste can be re-used.

A spectacle lens obtained from the resin composition of the present invention has a high total light transmittance while retaining ultraviolet shielding ability.

INDUSTRIAL FEASIBILITY

The resin composition of the present invention is useful as a material for molded articles such as spectacle lenses.

The invention claimed is:

1. A resin composition comprising
   (1) 100 parts by weight of polycarbonate resin,
   (2) 0.1 to 0.35 part by weight of at least one ultraviolet absorber (A) selected from the group consisting of 2-(2H-benzotriazol-2-yl)-p-cresol and 2-(2H-benzotriazol-2-yl)-4-(1,1,3,3-tetramethylbutyl) phenol,
   (3) 0.01 to 0.27 part by weight of at least one ultraviolet absorber (B) selected from the group consisting of 2-[5-chloro(2H)-benzotriazol-2-yl]-4-methyl-6-(tert-butyl) phenol, 2,2'-methylenebis[4-(1,1,3,3-tetramethylbutyl)-6-(2H-benzotriazol-2-yl)phenol] and 2-(2H-benzotriazol-2-yl)-4,6-bis(1-methyl-1-phenylethyl) phenol, and
   (4) 0.01 to 0.5 part by weight of at least one thioether-based compound (C) selected from the group consisting of a compound represented by the following formula (I) and a compound represented by the following formula (II):

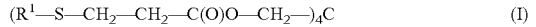

(I)

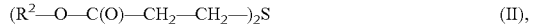

(II), (wherein $R^1$ is an alkyl group having 4 to 20 carbon atoms, and $R^2$ is an alkyl group having 6 to 22 carbon)atoms,
   wherein the weight ratio of the ultraviolet absorber (B) to the ultraviolet absorber (A) in terms of (B)/(A) is in the range of 0.05 to 1.

2. The resin composition according to claim 1, wherein the ultraviolet absorber (A) is 2-(2H-benzotriazol-2-yl)-4-(1,1,3,3-tetramethylbutyl) phenol and the ultraviolet absorber (B) is at least one selected from the group consisting of 2-[5-chloro (2H)-benzotriazol-2-yl]-4-methyl-6-(tert-butyl)phenol and 2,2'-methylenebis [4-(1,1,3,3-tetramethylbutyl)-6-(2H-benzotriazol-2-yl)phenol].

3. The resin composition according to claim 1, wherein the thioether-based compound (C) is pentaerythritol tetrakis(3-laurylthiopropionate).

4. The resin composition according to claim 1, further comprising a phosphorus-based heat stabilizer (D) in an amount of 0.001 to 0.2 part by weight based on 100 parts by weight of the polycarbonate resin.

5. The resin composition according to claim 1, further comprising a hindered phenol-based heat stabilizer (E) in an amount of 0.001 to 0.1 part by weight based on 100 parts by weight of the polycarbonate resin.

6. The resin composition according to claim 1, wherein the polycarbonate resin contains 2,2-bis(4-hydroxyphenyl)propane as the main diphenol component.

7. A molded article of the resin composition of claim 1.

8. A spectacle lens made of the resin composition of claim 1.

* * * * *